METHOD FOR THE PREPARATION OF ALUMINA FIBERS

Philip H. Brisbin, Schenectady, and William J. Heffernan, Delmar, N.Y., assignors to General Electric Company, a corporation of New York
No Drawing. Filed Oct. 13, 1960, Ser. No. 62,335
5 Claims. (Cl. 23—142)

This invention pertains to the preparation of alumina crystals in a form wherein the long axis of the crystal is about 10 times or more the remaining crystal directions. More particularly, this invention pertains to the preparation of the alumina fibers by the vapor hydrolysis chemical reaction of a volatile aluminum compound.

It is known to prepare alumina fiber from the vaporization of alumina directly. By reason of the extremely elevated temperatures required for any appreciable vaporization of alumina, however, the direct vaporization of alumina powder followed by subsequent condensation in fiber form requires the most refractory of materials in which to conduct the process. Vaporization of alumina under reduced pressure will not effectively lower the operating temperatures, hence, the preparation of alumina fibers by direct vaporization of alumina is a process which has little commercial attractiveness. On the other hand, it is also known to react an aluminum halide with water at lower temperatures and to form alumina deposits of crystalline character. The latter process which has generally been employed to form coatings of alumina on other objects is conducted at elevated temperatures and employs as a reactant mixture, a volatile aluminum compound, carbon dioxide, and hydrogen. The form of the alumina in the coating, however, although crystalline in structure is of the dense-pack (massive) type having crystalline dimensions more uniform in all directions, as distinct from the fiber type structure of the invention.

The applicants have discovered, surprisingly, that a volatile aluminum compound, carbon dioxide and hydrogen can be reacted in a particular manner to yield alumina fibers having lengths up to approximately one-quarter inch. The method of the invention comprises the hydrolysis of the volatile aluminum compound in a prescribed manner and under controlled conditions of vacuum and temperature, followed by condensation of the alumina product in fiber form. That condensation of the alumina product takes place in fiber form is surprising upon consideration that reaction conditions other than specified hereinafter will yield the dense-pack form of crystal or even amorphous powdered alumina. More specifically, it has been discovered that a mixture of a volatile aluminum compound, carbon dioxide, and hydrogen, when reacted at temperatures in the range of 1100–1500° C. and at reduced operating pressures of 100 mm. of mercury or less forms a plurality of individual alumina fibers of up to one-quarter inch in length, which fibers are generally fashioned on the walls of the reaction chamber. At conditions of temperature and pressure other than those specified, the alumina deposit will be predominantly or substantially of the dense-pack type crystalline form and/or an amorphous product. The alumina fibers of the invention are especially suitable as reinforcing agents for a refractory body. Because of their greater length compared to the fibrous form of anhydrous alpha-alumina, the present fibers provide a greater degree of mechanical reinforcement for the ceramic body. The fibers can also be expected to be useful as high temperature thermal insulation.

The invention may be practiced in its preferred embodiment as illustrated in the following examples and in subsequent discussion thereon, but is not limited thereto.

Example 1

Into a 3/16 inch inside diameter alumina tube of approximately 6 inch length, there was admitted a mixture of hydrogen, carbon dioxide and aluminum chloride ($Al_2Cl_6$) which had been preheated to approximately 200° C. The preheated gaseous mixture was reacted merely by passage through the tube operated at temperatures of 1180° C. at the entrance for the gaseous mixture and as high as 1500° C. near the exit end of the tube. The heating of the alumina tube was obtained through external means comprising a closely fitted molybdenum wire-wound tube furnace surrounding the outside of the said alumina tube. Flow of the gaseous reactants through the reaction tube was obtained by means of a vacuum pump connected to the discharge end of the reaction tube, which pump was operated at a discharge pressure of approximately 25–50 mm. mercury vacuum. The feed rates for the gaseous reactants delivered to the reaction tube average 450 standard millimeters per minute for the carbon dioxide, 225 standard millimeters per minute for the hydrogen and 400 milligrams per minute for the aluminum chloride ($Al_2Cl_6$). Under these conditions, the formation of fiber proceeded so copiously that the process was necessarily terminated after approximately 10–15 minutes due to such extensive fiber deposition inside the reaction tube that the further passage of unreacted gases was prevented. Although the fiber deposition occurred generally throughout the downstream half of the reaction tube, the greatest formation of fiber was concentrated at the exit or high temperature end of the tube.

The fibers formed in the above process were examined petrographically and found to each comprise a single crystal of hexagonal structure with the long axis of the fiber in the crystallographic c direction. The length of the fibers was found to range from 0.2 millimeter to 2.5 millimeters with an average length of about 1 millimeter and an average diameter of about 0.05 millimeter.

Example 2

To illustrate still other conditions within the contemplation of the process of the invention, alumina fibers were prepared employing the apparatus described in Example 1 but utilizing different reactant gas flow rates, operating temperatures and reaction times. Accordingly, the mixture of carbon dioxide, hydrogen, and aluminum chloride which had been preheated to approximately 200° C. was delivered to the reaction tube at the following rates: 300 standard millimeters per minute of carbon dioxide, 150 standard millimeters per minute of hydrogen, and 425 milligrams per minute of aluminum chloride ($Al_2Cl_6$). The reaction tube wall temperatures ranged from to about 1100° at the entrance region to approximately 1250° C. at a point near the exit of the tube. Flow of the gas mixture through the reaction tube was obtained by exerting approximately 25 mm. of mercury vacuum at the exit end of the reaction tube. The form of alumina fiber prepared under these conditions was substantially comparable to the fiber obtained in Example 1.

Example 3

Alumina fibers of both smaller size and having different ratios of diameter to length than the preceding examples and alumina fibers having an average length of 0.3 mm. and an average diameter of 0.03 mm. were prepared in the apparatus in Example 1 under somewhat modified operating conditions. A mixture of the preheated reactant gases was admitted to the reaction tube at the following rates: carbon dioxide at a rate of 250 standard millimeters per minute, hydrogen at a rate of 125 standard millimeters per minute and aluminum chloride ($Al_2Cl_6$) at a rate of approximately 350 milligrams per minute. The upward ranging temperature gradient in the reaction tube during fiber formation was maintained from about 1150° C. in the entrance region to approximately 1300° C. at the exit end of the tube. A vacuum of approximately 5 millimeters of mercury was exerted in the reaction tube throughout the fiber formation interval which lasted approximately 30 minutes. The rate of fiber formation and the type of fiber product produced during the process was substantially comparable to that obtained in Example 1.

*Example 4*

To demonstrate the necessity for employment of the conditions heretofore outlined for the preparation of the alumina fiber, it was unsuccessfully attempted to obtain fiber by means of an alternate process. Gaseous aluminum chloride ($Al_2Cl_6$) and water vapor which had been preheated to approximately 200° C. were admitted to the reaction tube apparatus of Example 1 at flow rates equivalent to those employed in that example. The water vapor was admitted to the reaction tube in a carrier stream of argon and mixed with the aluminum chloride gas in the heated reaction tube where hydrolysis of the aluminum chloride to alumina took place. The temperature in the reaction tube throughout the process was maintained at approximately 1400° C. A vacuum of approximately 14 millimeters of mercury was exerted in the reaction tube throughout the process. The alumina product formed during the 60 minute time interval of the process was entirely in the form of non-adherent powder, which subsequently petrographic examination determined to be of an amorphous rather than crystalline structure.

The unsuccessful experimental results obtained in Example 4 illustrates the criticality of certain parameters for the process of obtaining alumina fiber in crystalline form. The applicants, while not fully understanding the phenomenum of the reaction which results in the particular form of alumina produced by the process of the invention and therefore not desiring to have the invention limited to any particular phenomena described, have nevertheless formulated certain general theoretical considerations which can be presented in order to furnish a better understanding of the process. It appears that crystalline alumina fibers are produced by an axial screw dislocation mechanism. It there appears that crystal growth from a mixture of the gaseous alumina reaction product occurs by this mechanism only at very small supersaturation of the reaction chamber whereas, the ordinary growth of type (dense-pack type) of alumina crystal by the two-dimensional nucleation mechanism requires that the supersaturation exceed a critical value. From these theoretical considerations, it follows that growth of the crystalline alumina fiber by the mechanism of an axial screw dislocation occurs when the supersaturation is below the critical level for an appreciable rate of two-dimensional nucleation. Consequently, the maintainance of a sub-critical level of supersaturation appears to be a prime requisite for the exclusive or substantial production of the crystalline alumina fiber structure. It, therefore, follows that the process parameters for the formation of the fibers must be controlled so as to limit the degree of supersaturation appearing during the reaction. More specifically, the hydrolysis reaction from which the crystalline alumina fiber is formed according to the examples can be expressed by the following chemical equations:

$$CO_2 (g) + H_2 (g) \rightarrow H_2O (g) + CO (g) \quad (1)$$
$$3H_2O (g) + Al_2Cl_6 (g) \rightarrow Al_2O_3 (s) + 6HCl (g) \quad (2)$$

For the above chemical reactions to take place so as to form the crystalline alumina fiber, it is believed required that the concentration of the gaseous alumina products in the gas stream not exceed critical supersaturation. Operation of the process under reduced pressure or vacuum tends to depress supersaturation by reduction of the reaction rate. Likewise, the concentration level for saturation will increase with temperature and therefore, relatively high reaction temperatures in the reaction chamber can be expected to depress supersaturation by increasing the saturation concentration for the system. Finally, the upward ranging temperature gradient in the reaction chamber is also a condition reasonably expected to maintain a reduced level of supersaturation. In further explanation, it can be expected that the concentration of the product species in the vapor stream will increase as a function of the length of flow pass traversed due to incomplete consumption of alumina reaction products by crystallization. Therefore, in terms of an isothermal flow pass, supersaturation of the vapor can be expected to increase as a function of pass length. Where an upward ranging temperature gradient is present, however, the concentration level for saturation will also increase with pass length thus, the increasing alumina product concentration in the vapor will be accompanied by increasing saturation concentration reference values in the pass through the reaction chamber. The over-all effect would be to restrain the rise of supersaturation.

From the results of the examples and considering the above theoretical discussion, it is apparent that alumina fiber formation will be dependent upon conditions of operation during the hydrolysis reaction. Accordingly, optimum conditions for fiber formation can also be expected to depend somewhat upon the size of the apparatus reaction chamber because of its obvious effect upon the operating conditions of reactant feed rates, upward ranging temperature gradient in the reaction chamber and reduced pressure conditions. While the applicant has not investigated all conceivable conditions which will produce aluminum fiber according to the process of the invention, because of the exceedingly great number of variations possible in the process parameters already discussed, certain minimum conditions have been established experimentally for fiber preparation. As has been stated heretofore, the gaseous reaction mixture must be introduced into a reaction chamber heated to at least 1100° C. at the inlet zone for the introduction of the gaseous mixture. It is thereafter necessary to react the gaseous mixture by passage through the reaction chamber while maintaining said reaction chamber at a reduced pressure of at least 100 millimeters of mercury vacuum and while simultaneously maintaining an upward temperature gradient in the reaction chamber along the direction of gas flow.

It is not intended to limit the process of the invention to the preparation of alumina fiber in a tubular reaction chamber of the type illustrated in the above examples. For example, it is obvious that many other reaction vessels are known which permit the passage of gases at the operating conditions above described. Further, there is believed to be no necessity for a circular cross section in the reaction chamber since other geometrical shapes are believed entirely satisfactory where desirable. It will, therefore, be apparent to the man skilled in the art to contemplate numerous other reaction chambers for the practice of the invention without departing from the scope thereof.

Further, it is not intended to limit the invention to the hydrolysis of aluminum chloride disclosed in the above examples. For example, any volatile aluminum halide can be substituted for aluminum chloride on an equivalent weight basis in the said examples and substantially comparable results achieved. Suitable volatile aluminum compounds for the practice of the invention can be selected from the class of aluminum compounds which are volatile at the reaction temperatures indicated and which also react with water to form aluminum oxide in the somewhat reducing atmospheric conditions of the reaction chamber. In addition to the aluminum halides specified, suitable volatile aluminum compounds can be selected generally from the class of aluminum organic compounds such as aluminum isoproxide and aluminum ethoxide.

It is, therefore, intended to limit the invention only by the scope of the following claims.

What we claim as new and desire to secure by Letters Patent of the United States is:

1. A process for alumina fiber preperation comprising (1) the introduction of a gaseous mixture of a volatile aluminum compound, carbon dioxide and hydrogen into a reaction chamber heated to at least 1100° C. at the inlet zone for the introduction of the gaseous mixture, (2) thereafter reacting the gaseous mixture during passing through the reaction chamber to form alumina at a reduced pressure of not more than 100 mm. of mercury vacuum and while simultaneously maintaining a temperature gradient in the reaction chamber along the direction of the gas flow up to a temperature of approximately 1500° C. at the exit end of the reaction chamber, and (3) finally depositing the alumina reaction product of (2) at the exit end of the reaction chamber in the form of single crystal fibers of hexagonal structure.

2. A process as in claim 1 wherein the volatile aluminum compound is an aluminum halide.

3. A process as in claim 1 wherein the volatile aluminum compound is aluminum chloride.

4. A process for alumina fiber preparation comprising (1) the introduction of a preheated gaseous mixture of a volatile aluminum compound, carbon dioxide, and hydrogen, the gaseous mixture being preheated to a temperature sufficient to volatilize the aluminum compound into a reaction chamber heated to at least 1100° C. at the inlet zone for the introduction of the gaseous mixture, (2) thereafter reacting the gaseous mixture during passage through the reaction chamber to form alumina at a reduced pressure of not more than 100 mm. of mercury while simultaneously maintaining an upward ranging temperature gradient in the reaction chamber along the direction of gas flow up to a temperature of approximately 1500° C., (3) finally depositing these alumina reaction products of (2) at the exit end of the reaction chamber in the form of single crystal fibers of hexagonal structure.

5. A process for alumina fiber preparation comprising (1) the continuous introduction of a preheated gaseous mixture of a volatile aluminum compound, carbon dioxide, and hydrogen, the gaseous mixture being preheated to a temperature sufficient to volatilize the aluminum compound into a reaction chamber heated to at least 1100° C. at the inlet zone for the introduction of the gaseous mixture, the rate of introduction of the gaseous mixture being below that which will supersaturate the reaction chamber, (2) thereafter reacting the gaseous mixture during passage through the reaction chamber to form alumina at a reduced pressure of not more than 100 mm. of mercury and while simultaneously maintaining an upward temperature gradient in the reaction chamber along the direction of gas flow and, (3) finally depositing the alumina reaction product of (2) at the exit end of the reaction chamber in the form of single crystal fibers of hexagonal structure.

References Cited in the file of this patent

UNITED STATES PATENTS

| | | |
|---|---|---|
| 1,953,201 | Tosterud | Apr. 3, 1934 |
| 2,798,049 | White et al. | July 2, 1957 |
| 2,823,982 | Saladin et al. | Feb. 18, 1958 |
| 2,915,475 | Bugosh | Dec. 1, 1959 |
| 3,011,870 | Webb et al. | Dec. 5, 1961 |

FOREIGN PATENTS

| | | |
|---|---|---|
| 165,589 | Australia | Oct. 13, 1955 |

OTHER REFERENCES

Brenner: "Acta Metallurgica," vol. 4, January 1956, pages 62–74, and pages 268–270.

Webb et al.: "Journal of Applied Physics," vol. 28, No. 12, December 1957, pages 1449–1454.

Beletsku et al.: "Doklady Akad. Nauk., SSSR," vol. 80, 1951, pages 751–754.

Russell, A. S.: "Alumina Properties," Technical Paper No. 10, Aluminum Co. of America, Pittsburgh, Pa., 1953, 35 pages (page 7 of particular interest).